US010298587B2

(12) United States Patent
Hook et al.

(10) Patent No.: US 10,298,587 B2
(45) Date of Patent: May 21, 2019

(54) PEER-TO-PEER AUGMENTED REALITY HANDLERS

(71) Applicant: INTERNATIONAL BUSINESS MACHINES CORPORATION, Armonk, NY (US)

(72) Inventors: James K. Hook, Eastleigh (GB); Hamish C. Hunt, Ashford (GB); Nicholas K. Lincoln, Hampshire (GB); Benjamin Miller, Oxford (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 341 days.

(21) Appl. No.: 15/186,835

(22) Filed: Jun. 20, 2016

(65) Prior Publication Data
US 2017/0366554 A1     Dec. 21, 2017

(51) Int. Cl.
*H04L 29/06*     (2006.01)
*H04L 29/08*     (2006.01)
(Continued)

(52) U.S. Cl.
CPC ............ *H04L 63/101* (2013.01); *G06F 3/013* (2013.01); *G06F 3/04842* (2013.01);
(Continued)

(58) Field of Classification Search
CPC ..... H04L 63/101; H04L 67/104; H04L 29/06; H04L 29/08; G06F 3/013; G06F 3/0484;
(Continued)

(56) References Cited

U.S. PATENT DOCUMENTS 7,693,702 B1 *  4/2010  Kerner ................. G06T 19/006
                                                              345/629
9,361,733 B2 *  6/2016  Lee ........................ G09G 3/003
(Continued)

OTHER PUBLICATIONS

Ohshima, T. et al., "AR2Hockey: A Case Study of Collaborative Augmented Reality" IEEE Virtual Reality Annual International Symposium (Mar. 1998) pp. 268-275.
(Continued)

*Primary Examiner* — Jayesh M Jhaveri
(74) *Attorney, Agent, or Firm* — Tutunjian & Bitetto, P.C.; Scott Dobson

(57) ABSTRACT

A method and system are provided for generating peer-to-peer augmented reality handlers. The method includes receiving, from a user wearing a pair of augmented reality glasses, an indication that the user intends to place an augmented reality handler at a location where the user is currently looking. The augmented reality handler is for visually associating content with an item of interest to the user. The method further includes determining, by the augmented reality glasses, the location where the user is currently looking. The method also includes creating the augmented reality handler in three-dimensional space at the location and presenting, by the augmented reality glasses, the augmented reality handler to the user. The method additionally includes creating an access control list to determine authorized individuals able to use this handler. The method further includes presenting the augmented reality handler to the authorized individuals, based on the access control list.

20 Claims, 7 Drawing Sheets

(51) Int. Cl.
*G06F 3/0484* (2013.01)
*G06Q 50/00* (2012.01)
*G06F 21/62* (2013.01)
*G06T 19/00* (2011.01)
*G06F 3/01* (2006.01)

(52) U.S. Cl.
CPC ......... *G06F 21/6209* (2013.01); *G06Q 50/01* (2013.01); *G06T 19/006* (2013.01); *H04L 67/104* (2013.01); *G06T 2219/024* (2013.01)

(58) Field of Classification Search
CPC ........ G06F 21/00; G06F 3/01; G06F 3/04842; G06F 21/62; G06F 21/6209; G06T 19/006; G06T 2219/024; G06T 19/00; G06Q 50/00; G06Q 50/01
See application file for complete search history.

(56) References Cited

U.S. PATENT DOCUMENTS

| | | | |
|---|---|---|---|
| 9,741,168 B2 * | 8/2017 | Ohashi | G02B 27/017 |
| 2011/0221771 A1 | 9/2011 | Cramer et al. | |
| 2012/0198021 A1 * | 8/2012 | Ahn | G06T 19/006 709/217 |
| 2013/0194304 A1 | 8/2013 | Latta et al. | |
| 2014/0210856 A1 * | 7/2014 | Finn | G01C 15/002 345/633 |
| 2014/0267234 A1 | 9/2014 | Hook et al. | |
| 2015/0113581 A1 | 4/2015 | McArdle et al. | |
| 2015/0156028 A1 | 6/2015 | Ballard et al. | |
| 2015/0302649 A1 * | 10/2015 | Komatsu | G06T 19/006 345/633 |
| 2016/0253843 A1 * | 9/2016 | Lee | G06F 3/04815 345/633 |
| 2017/0289535 A1 * | 10/2017 | Crispin | H04N 17/004 |

OTHER PUBLICATIONS

Kato, H. et al., "Marker Tracking and HMD Calibration for a Video-based Augmented Reality Conferencing System" 2nd IEEE and ACM International Workshop on Augmented Reality (Oct. 1999) pp. 85-94.

* cited by examiner

PEER-TO-PEER AUGMENTED REALITY HANDLERS

BACKGROUND

Technical Field

The present invention relates generally to augmented reality and, in particular, to peer-to-peer augmented reality handlers.

Description of the Related Art

Augmented Reality (AR) can enhance a user experience relating to a specific point of interest, providing additional information or other features relating to a specific position. AR handlers can be read by an AR device and, thus, can point to some added value, a common example being QR codes and related artifacts. One chief problem is the lack of efficiency of such handlers as users have to go to the trouble of printing physical media to associate the real world with the physical world. It can also be frustrating for users who have no interest in a particular physical code or have several to choose from and do not wish to spend time investigating what a particular code does. Moreover, all conventional AR handlers require physical media of some kind to be read. Thus, there is a need for improved augmented reality handlers.

SUMMARY

According to an aspect of the present principles, a method is provided for generating peer-to-peer augmented reality handlers. The method includes receiving, from a user wearing a pair of augmented reality glasses, an indication that the user intends to place an augmented reality handler at a location where the user is currently looking. The augmented reality handler is for visually associating content with an item of interest to the user. The method further includes determining, by the pair of augmented reality glasses, the location where the user is currently looking. The method also includes creating the augmented reality handler in three-dimensional space at the location and presenting, by the pair of augmented reality glasses, the augmented reality handler to the user. The method additionally includes creating an access control list to determine authorized individuals able to use this handler. The method further includes presenting the augmented reality handler to the authorized individuals, based on the access control list.

According to another aspect of the present principles, a computer program product is provided for generating peer-to-peer augmented reality handlers. The computer program product includes a non-transitory computer readable storage medium having program instructions embodied therewith. The program instructions are executable by a computer to cause the computer to perform a method. The method includes receiving, from a user wearing a pair of augmented reality glasses, an indication that the user intends to place an augmented reality handler at a location where the user is currently looking. The augmented reality handler is for visually associating content with an item of interest to the user. The method further includes determining, by the pair of augmented reality glasses, the location where the user is currently looking. The method also includes creating the augmented reality handler in three-dimensional space at the location and presenting, by the pair of augmented reality glasses, the augmented reality handler to the user. The method additionally includes creating an access control list to determine authorized individuals able to use this handler. The method further includes presenting the augmented reality handler to the authorized individuals, based on the access control list.

According to yet another aspect of the present principles, a system is provided for generating peer-to-peer augmented reality handlers. The system includes a pair of augmented reality glasses, having a processor, a memory, and a display integrated therein. The pair of augmented reality glasses are configured to receive, from a user wearing the pair of augmented reality glasses, an indication that the user intends to place an augmented reality handler at a location where the user is currently looking. The augmented reality handler is for visually associating content with an item of interest to the user. The pair of augmented reality glasses are further configured to determine the location where the user is currently looking. The pair of augmented reality glasses are also configured to create the augmented reality handler in three-dimensional space at the location and present the augmented reality handler to the user. The pair of augmented reality glasses are additionally configured to create an access control list to determine authorized individuals able to use this handler. The pair of augmented reality glasses are further configured to present the augmented reality handler to the authorized individuals, based on the access control list.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to peer-to-peer Augmented Reality (AR) handlers.

The present principles solve the problem of associating real world objects with added AR data without needing physical links to be read.

Each AR device, using a combination of the direction a user is looking and eye focus on a user's glasses, creates a marker in three-dimensional (3D) space where the user is looking. When the user looks at this marker again and is authorized to do so, the user can start writing virtual notes and save them to this handler. Via peer-to-peer relative locations, others with devices can be notified of a created handler and their relative position of the creator and hence where the handler is relative to them. Thus, the other devices too can locate the handler and, hence, the point of interest. If the other devices so choose, they can add to the conversation or add more data to this handler if the access control list set up for this handler allows them to do so.

This eliminates the drawbacks of physical media including, but not limited to: not taking up real estate; the ability to superimpose media without restriction; the viewing of media even if the media behind an obstacle; and an automatic tear-down of handlers if the handlers are deemed no longer useful.

Figure 1:
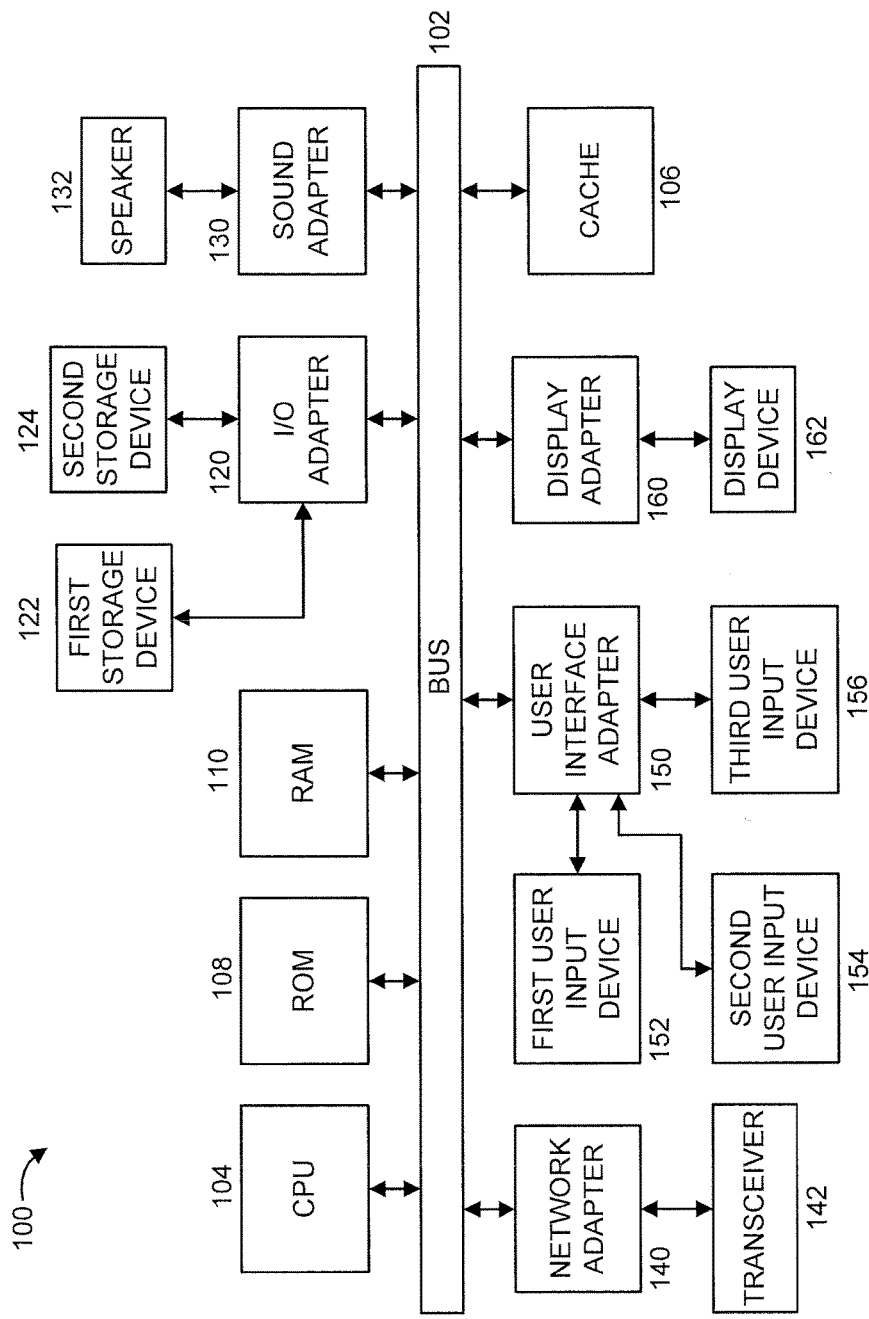
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that system 200 and variant 300 described below regarding FIGS. 2 and 3, respectively, are systems for implementing respective embodiments of the present principles. Part or all of processing system 100 may be implemented in one or more of the elements of system 200 and/or in one or more of the elements of variant 300.

Figure 4:
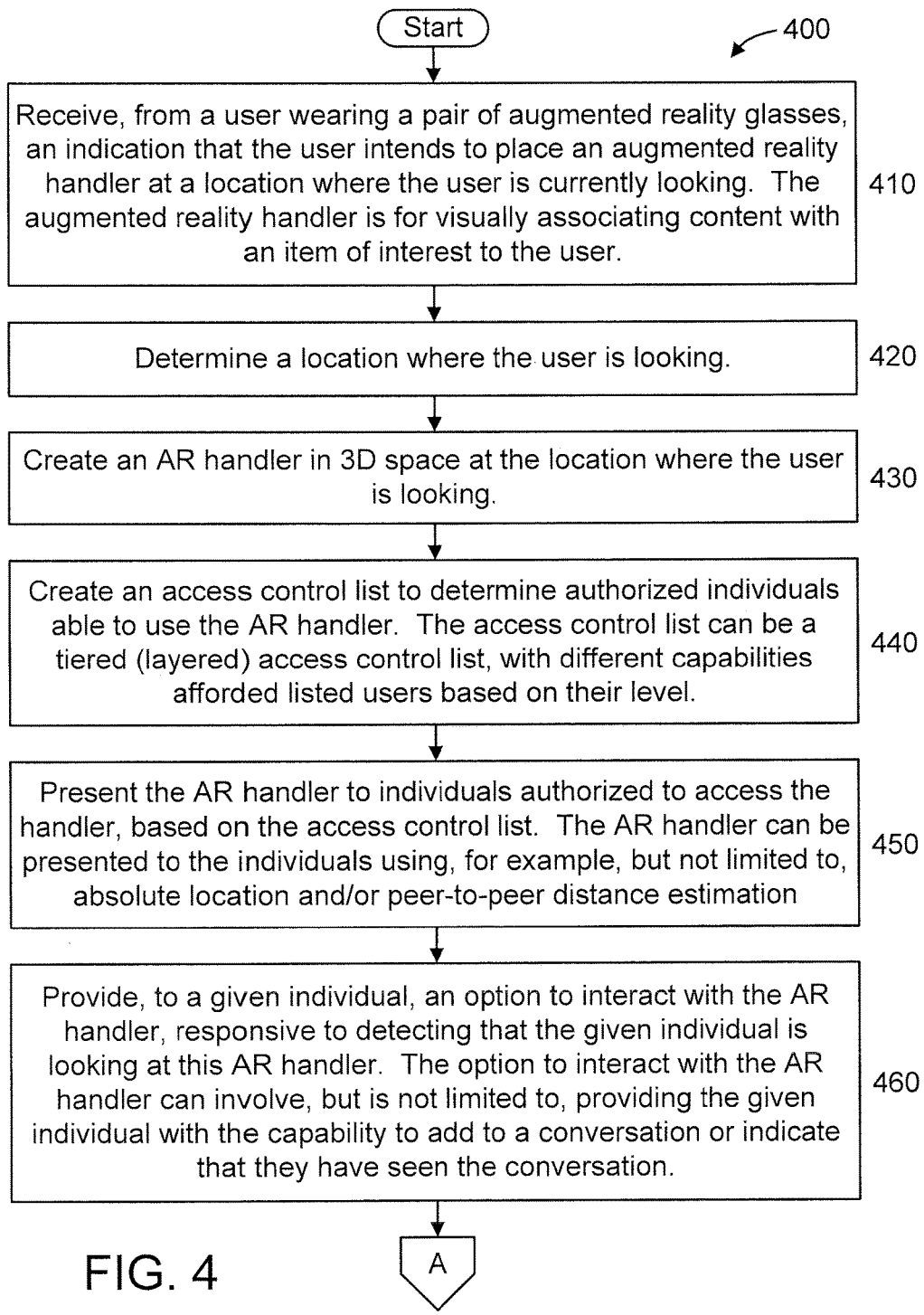
FIGS. 4-5 show an exemplary method for creating and managing peer-to-peer augmented reality handlers, in accordance with an embodiment of the present principles.
Figure 5:
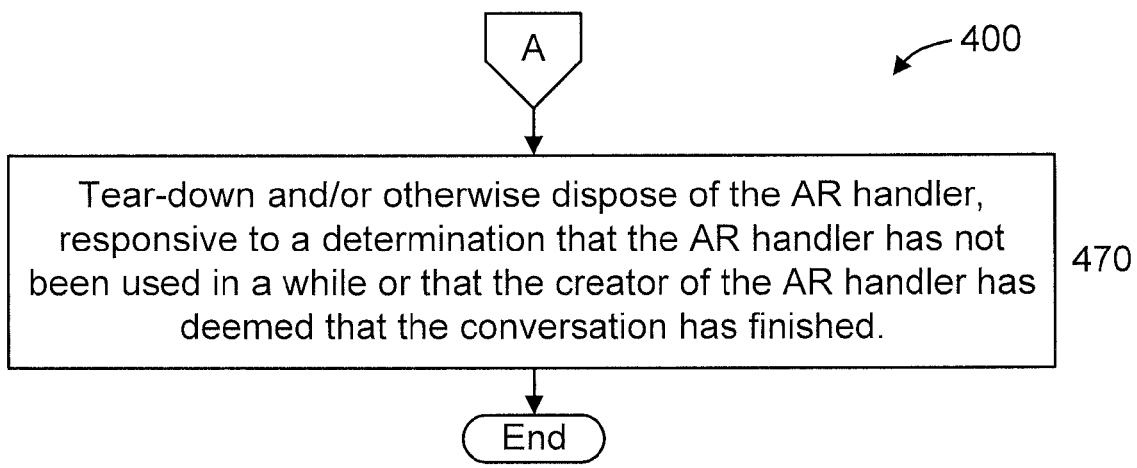

Further, it is to be appreciated that processing system 100 may perform at least part of the method described herein including, for example, at least part of method 400 of FIGS. 4-5. Similarly, part or all of system 200 may be used to perform at least part of method 400 of FIGS. 4-5. Also, part or all of variant 300 may be used to perform at least part of method 400 of FIGS. 4-5.

Figure 2:
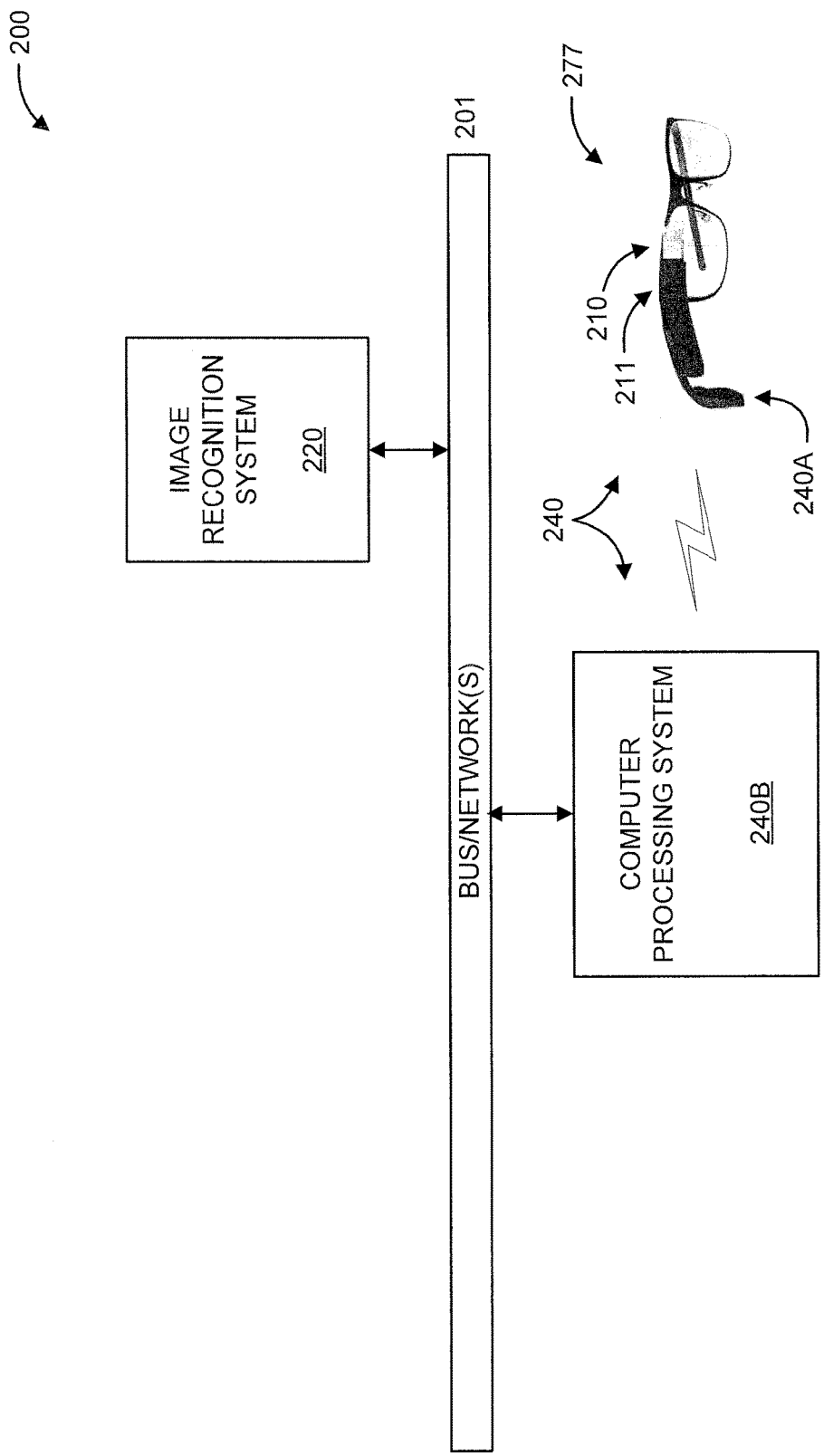
FIG. 2 shows an exemplary system for creating and managing peer-to-peer augmented reality handlers, in accordance with an embodiment of the present principles.

FIG. 2 shows an exemplary system 200 for creating and managing peer-to-peer augmented reality handlers, in accordance with an embodiment of the present principles.

The system 200 includes a display 210, a camera 211, an image recognition system 220, and a computer processing system 240. In an embodiment, at least the display 210 and the camera 211 are implemented using (resident on) an augmented reality viewing device/glasses (hereinafter "augmented reality glasses") 277. Moreover, computer processing system 240 can include two computer processing systems 240A and 240B, one of which (e.g., 240A) can also be implemented using (resident on) the augmented reality glasses 277. The augmented reality glasses 277 can communicate wirelessly (e.g., through WIFI, Bluetooth, etc.) with the computer processing system 240 (e.g. 240B) (via, e.g., a network adapter in the augmented reality glasses 277) and/or using a wired connection (e.g., a USB double-ended connector).

The display 210 can provide an augmented reality view to a user. For example, the display 210 can allow the user to view an item to which the user intends to associate with an augmented reality handler. The display 210 can also allow the user to view the augmented reality handler.

The camera 211 can capture images/video of objects seen by the user. The images/video can then be processed by the computer processing system 240 and/or any of the systems under its control. The camera 211 can be capable of capturing still and moving images.

The computer processing system 240 essentially controls the other systems of system 200, including the image recognition system 220.

The image recognition system 220 recognizes images. The image recognition system 220 can, for example, be used to determine that a scene depicted in an image has changed, possibly warranting attention (mentioning) by the handler as a new development or possibly warranting a teardown of the handler due to the underlying content to which the handler is associated having become moot, and so forth. The image recognition system 220 can also recognize gestures from images. Such recognized gestures can represent user commands/intentions/etc.

The computer processing system 240 performs functions relating, for example, but not limited to: receiving, from a user wearing a pair of augmented reality glasses, an indication that the user intends to place an augmented reality handler at a location where the user is currently looking; determining a location where the user is looking; creating an AR handler in 3D space at the location where the user is looking; create an access control list to determine authorized individuals able to use the AR handler; presenting the AR handler to individuals authorized to access the handler, based on the access control list; providing, to a given individual, an option to interact with the AR handler, responsive to detecting that the given individual is looking at this AR handler; and tearing down and/or otherwise disposing of the AR handler, responsive to a determination that the AR handler has not been used in a while or that the creator of the AR handler has deemed that the conversation has finished. These functions can be performed, for example, with and/or to support the functions of another element of system 200.

In an embodiment, one or more of at least part of the elements (e.g., but not limited to, the image recognition system 220 and the computer processing system 240) of system 200 can be implemented in the cloud using a cloud-based configuration.

In the embodiment shown in FIG. 2, the elements thereof are interconnected by a bus(es)/network(s) 201. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present principles provided herein, while maintaining the spirit of the present principles.

Figure 3:
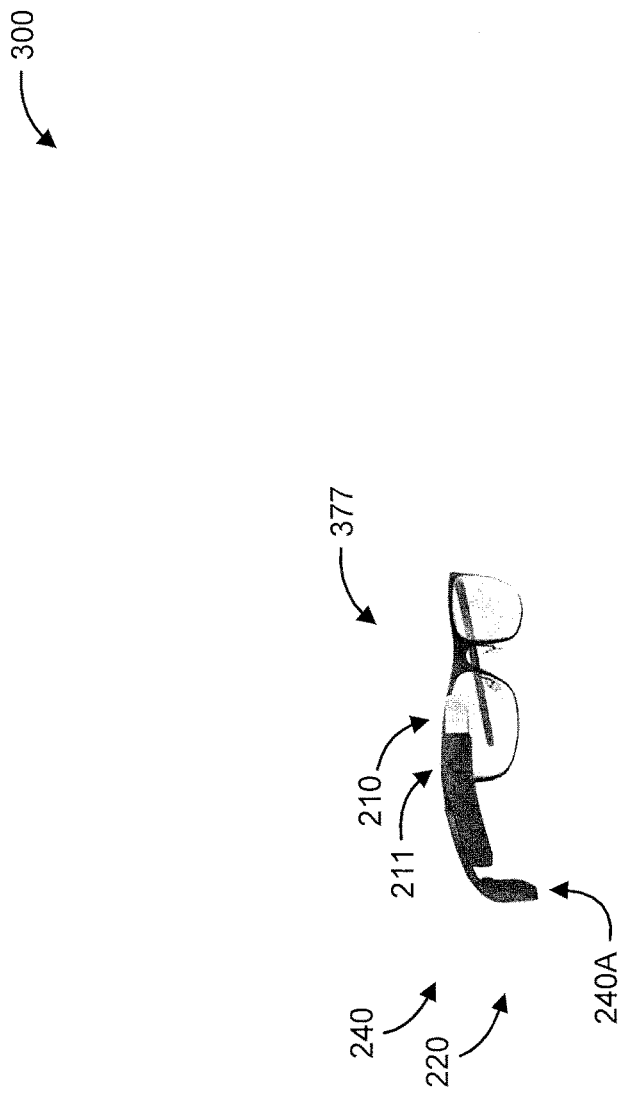
FIG. 3 shows a variant of the system of FIG. 2, in accordance with an embodiment of the present principles.

FIG. 3 shows a variant 300 of system 200 of FIG. 2, in accordance with an embodiment of the present principles.

The elements of variant 300 are similar to system 200, except for the image recognition system 220 and the computer processing system 240, which are also implemented using (resident on) augmented reality glasses 377. Thus, all of the elements of variant 300 are essentially implemented by the augmented reality glasses 377. However, one or more of the elements of variant 300 can be implemented/supplemented in the cloud using a cloud-based configuration. For example, part of computer processing system 240 can be implemented/supplemented in the cloud. These and other variations of the elements of variant 300 are readily determined by one of ordinary skill in the art given the teachings of the present principles provided herein, while maintaining the spirit of the present principles.

FIGS. 4-5 show an exemplary method 400 for generating peer-to-peer augmented reality handlers, in accordance with an embodiment of the present principles.

At step 410, receive, from a user wearing a pair of augmented reality glasses, an indication that the user intends to place an augmented reality handler at a location where the user is currently looking. The augmented reality handler is for visually associating content with an item of interest to the user. Thus, the associated content of the AR handler is visually perceptible to a user (viewer). The indication can be received, for example, via some type of actuator (button, and so forth), gesture, voice command, and so forth.

At step 420, determine a location where the user is looking.

At step 430, create an AR handler in 3D space at the location where the user is looking.

At step 440, create an access control list to determine authorized individuals (e.g., friends, everyone, certain individuals, and so forth) able to use (e.g., view or edit) the AR handler. In an embodiment, the access control list can be a tiered (layered) access control list, with different capabilities afforded listed users based on their level. For example, there can a beginning level, an intermediate level, and an advanced level. Of course, other level classifications can also be used, while maintaining the spirit of the present principles.

At step 450, present the AR handler to individuals authorized to access the handler, based on the access control list. The AR handler can be presented to the individuals using, for example, but not limited to, absolute location and/or peer-to-peer distance estimation (e.g., WIFI, Bluetooth, Radio Frequency Identification (RFID), and so forth). It is to be appreciated that any signaling communication technology can be used to present the AR handler to the individuals, while maintaining the spirit of the present principles.

At step 460, provide, to a given individual, an option to interact with the AR handler, responsive to (e.g., eye tracking) detecting that the given individual is looking at this AR handler. The option to interact with the AR handler can involve, but is not limited to, providing the given individual with the capability to add to a conversation or indicate that they have seen the conversation.

At step 470, tear-down and/or otherwise dispose of the AR handler, responsive to a determination that the AR handler has not been used in a while or that the creator of the AR handler has deemed that the conversation has finished. Disposal of the handler can include, but is not limited, deleting any data relating to the AR handler and/or data pointing to the AR handler.

A description will now be given of some exemplary applications to which the present principles can be applied, according to various embodiments of the present principles.

One exemplary application is presentations, where people can create AR handlers on particular locations on a slide and annotate them virtually for people that need more detail without disturbing the presenter (or the presenter can do so himself/herself by creating pre-configured annotation handlers). Users can sign up to a "beginners" access control list that can provide them with extra information without cluttering the screen for those who already know the material.

Another exemplary application is discovering interesting items. For example, if someone sees a temporary point of interest that could not be governed very easily by an individual note (and perhaps is also quite hard to find, thus requiring finely tuned location technology), they can highlight to others that something interesting is going on. People can then add to the conversation to let others know that the point of interest is no longer there. This prevents users from getting misled by a static note that remains regardless of what is actually going on now.

Yet another exemplary application is a social guest book, where people can associate comments for those in the vicinity to read and contribute towards. For example, persons visiting a static attraction (such as the Eiffel Tower) can add and share social media style tags, and those visiting a dynamic attraction (such as a glacier/waterfall that moves or indeed a museum attraction that may move globally) can add the same type of comments/thoughts and enable updating/refinement of the location information associated with the AR handle.

A description will now be given regarding exemplary extensions of the present principles, in accordance with various embodiments of the present principles.

One exemplary extension involves the user of image recognition which can, in turn, be used to improve the location service. For example, if someone is looking in a similar compass direction and location to the creator but sees something different (as determined through image recognition), this could indicate that something has changed in the situation. This could indicate that the handler needs to be torn down (or modified).

Another exemplary extension involves remote location mapping such as, for example, viewing a presentation and creating an AR handler on a section of that presentation to annotate the section. Others viewing that same presentation could have that AR handler relatively mapped to a location on their screen. They can then add to the conversation on that AR handler and replicate the AR handler across to others.

Yet another exemplary extension involves crowdsourced recalibration. For example, if a user who is authorized to alter the handler notices a "drift" between a point of interest and an AR handler (perhaps due to the point of interest physically moving over time), they can choose to correct the AR handler and keep the AR handler updated in line with what the AR handler is trying to reflect.

A description will now be given regarding underlying geometric relations upon which are based one or more embodiments of the present principles.

It can be presumed that the direction in which a user is looking can be determined precisely based upon eye tracking. It can be presumed that the geometry of the AR glasses and all components (cameras and displays) is known. Based on the preceding, it can be presumed that the eye location is known. Further based on the preceding, it can be presumed that the ability to determine the exact location on the AR glasses display where the user is looking and, in this case, would relate to an X-Y location on the image plane(s).

Accordingly, there are two ways relate the direction the user is looking in to a physical object in 3D space. One way is to identify the image plane XY intersection(s) and from this intersection identify the object that is being observed (i.e., pull the object from the video display and match the identified object). Another way is to project vectors into 3D space, determine their intersection and then determine the object that is in that location.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
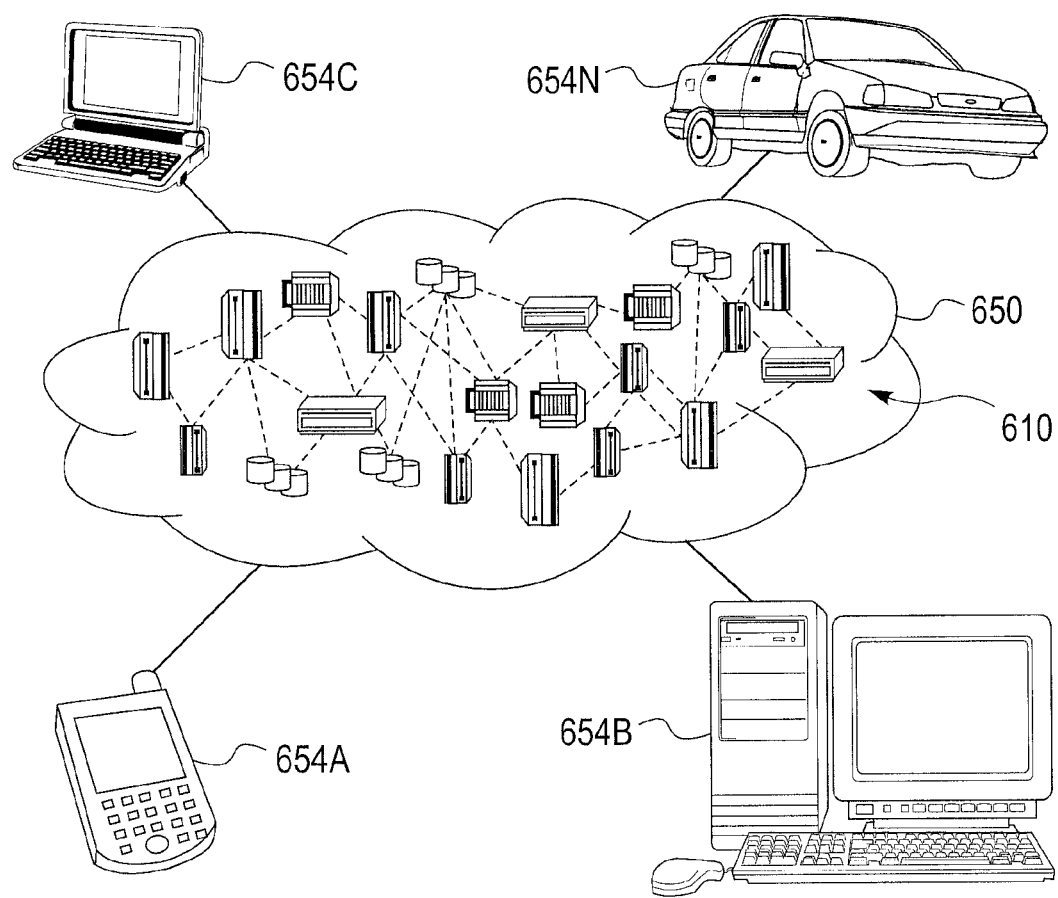
FIG. 6 shows an exemplary cloud computing environment, in accordance with an embodiment of the present principles.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
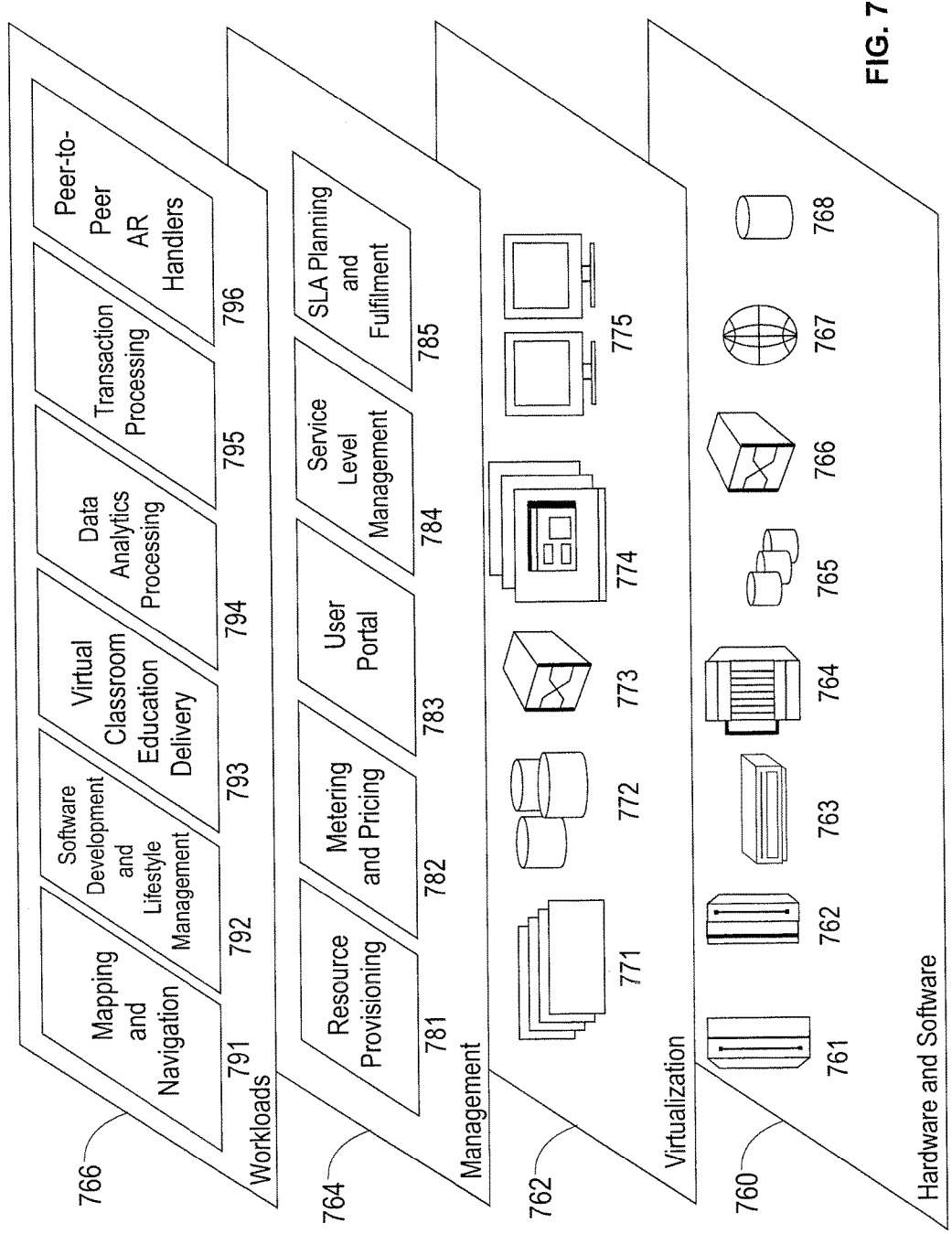
FIG. 7 shows an exemplary set of functional abstraction layers provided by the cloud computing environment shown in FIG. 6, in accordance with an embodiment of the present principles.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and peer-to-peer augmented reality (AR) handlers 796.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for generating peer-to-peer augmented reality handlers, comprising:
   receiving, from a user wearing a pair of augmented reality glasses, an indication that the user intends to place an augmented reality handler at a location where the user is currently looking, the indication being in a form of a user action in addition to looking at the location, the augmented reality handler for visually associating content with an item of interest to the user;
   determining, by the pair of augmented reality glasses, the location where the user is currently looking;
   creating the augmented reality handler in three-dimensional space at the location and presenting, by the pair of augmented reality glasses, the augmented reality handler to the user;
   creating an access control list to determine authorized individuals able to use this handler; and
   presenting the augmented reality handler to the authorized individuals, based on the access control list.

2. The method of claim 1, wherein the indication is in the form of a gesture or acoustic utterance.

3. The method of claim 1, wherein the augmented reality handler is presented to the authorized individuals using peer-to-peer distance estimation.

4. The method of claim 1, further comprising providing, to at least some of the authorized individuals, an option to interact with the augmented reality handler.

5. The method of claim 4, wherein the option to interact with the augmented reality handler is provided responsive to detecting that the at least some of the authorized individuals are looking at the augmented reality handler or a location corresponding to the augmented reality handler.

6. The method of claim 4, wherein the option to interact with the augmented reality handler comprises providing the at least some of the authorized individuals with a capability to indicate having seen a conversation or to add to the conversation.

7. The method of claim 4, wherein the option to interact with the augmented reality handler comprises providing the at least some of the authorized individuals with a capability to edit the augmented reality handler.

8. The method of claim 1, further comprising disposing of the augmented reality handler, responsive to a determination that the augmented reality handler has not been used in a threshold amount of time.

9. The method of claim 1, further comprising disposing of the augmented reality handler, responsive to a determination by a creator of the augmented reality handler that a conversation corresponding to the augmented reality handler has completed.

10. The method of claim 1, wherein the content is user generated content, and the item of interest is a physical item of interest to the user.

11. The method of claim 1, wherein the augmented reality handler is updateable by the user and the authorized individuals.

12. The method of claim 1, wherein the augmented reality handler is selectively configurable to allow crowdsourced recalibration of the augmented reality handler.

13. The method of claim 1, wherein the location where the user is currently looking, or a change in a scene at the location, is determined using image recognition.

14. The method of claim 1, further comprising generation a media presentation that uses the augmented reality handler.

15. The method of claim 14, wherein the augmented reality handler is used for remote location mapping in the media presentation.

16. The method of claim 1, wherein the access control list is a layered access control list that specifies different handler interaction capabilities for the authorized individuals based on which of a plurality of levels are assigned to the authorized individuals.

17. A computer program product for generating peer-to-peer augmented reality handlers, the computer program product comprising a non-transitory computer readable storage medium having program instructions embodied therewith, the program instructions executable by a computer to cause the computer to perform a method comprising:
receiving, from a user wearing a pair of augmented reality glasses, an indication that the user intends to place an augmented reality handler at a location where the user is currently looking, the indication being in a form of a user action in addition to looking at the location, the augmented reality handler for visually associating content with an item of interest to the user;
determining, by the pair of augmented reality glasses, the location where the user is currently looking;
creating the augmented reality handler in three-dimensional space at the location and presenting, by the pair of augmented reality glasses, the augmented reality handler to the user;
creating an access control list to determine authorized individuals able to use this handler; and
presenting the augmented reality handler to the authorized individuals, based on the access control list.

18. The computer program product of claim 17, further comprising providing, to at least some of the authorized individuals, an option to interact with the augmented reality handler.

19. The computer program product of claim 18, wherein the option to interact with the augmented reality handler is provided responsive to detecting that the at least some of the authorized individuals are looking at the augmented reality handler or a location corresponding to the augmented reality handler.

20. A system for generating peer-to-peer augmented reality handlers, comprising:
a pair of augmented reality glasses, having a processor, a memory, and a display integrated therein, the pair of augmented reality glasses being configured to:
receive, from a user wearing the pair of augmented reality glasses, an indication that the user intends to place an augmented reality handler at a location where the user is currently looking, the indication being in a form of a user action in addition to looking at the location, the augmented reality handler for visually associating content with an item of interest to the user;
determine the location where the user is currently looking;
create the augmented reality handler in three-dimensional space at the location and present the augmented reality handler to the user;
create an access control list to determine authorized individuals able to use this handler; and
present the augmented reality handler to the authorized individuals, based on the access control list.

* * * * *